United States Patent

Hughes

[15] 3,706,932

[45] Dec. 19, 1972

[54] AMPLITUDE INDEPENDENT, AUTOMATIC FREQUENCY CONTROL/DISCRIMINATOR

[72] Inventor: Richard Smith Hughes, China Lake, Calif.

[73] Assignee: The United States of America as represented by the Secretary of the Navy

[22] Filed: Jan. 7, 1971

[21] Appl. No.: 104,618

[52] U.S. Cl. ................325/438, 178/5.8 F, 325/419, 325/420, 325/423, 325/435, 325/442, 325/474, 328/71, 328/145, 329/122, 331/17

[51] Int. Cl. ................H04b 1/26

[58] Field of Search ..............325/346, 349, 418–420, 325/422, 423, 435, 438, 439, 442, 474–477, 329–331; 328/71, 145; 329/122, 123; 331/11, 12, 22, 43; 178/5.8 F

[56] References Cited

UNITED STATES PATENTS

| | | | |
|---|---|---|---|
| 3,502,988 | 3/1970 | Shelby | 325/420 |
| 2,204,342 | 6/1940 | Crosby | 325/435 |
| 2,544,311 | 3/1951 | Gottier | 325/331 |

*Primary Examiner*—Albert J. Mayer
*Attorney*—R. S. Sciascia and Roy Miller

[57] ABSTRACT

A system for deriving a constant intermediate frequency output over a band of input frequencies comprising a mixer, a power splitter for splitting the output of the mixer into two segments of equal power, two band pass filters connected to the power splitter and a servo loop incorporating a variable frequency local oscillator whose output is connected to the mixer such that the output of the local oscillator is controlled to maintain the output of the mixer at an essentially constant frequency.

6 Claims, 2 Drawing Figures

INVENTOR.
RICHARD SMITH HUGHES

BY ROY MILLER
ATTORNEY.

AMPLITUDE INDEPENDENT, AUTOMATIC FREQUENCY CONTROL/DISCRIMINATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In many frequency converters the intermediate frequency (IF) output must be held at a constant frequency for various input frequencies. This may be accomplished by varying a local oscillator input to a mixer such that $f_3 = f_1 - f_2 =$ a constant, where $f_1$ equals one input to the mixer, $f_2$ is the output of the oscillator to the mixer and $f_3$ is the IF output of the mixer.

DESCRIPTION OF THE PREFERRED EMBODIMENT

Figure 1:
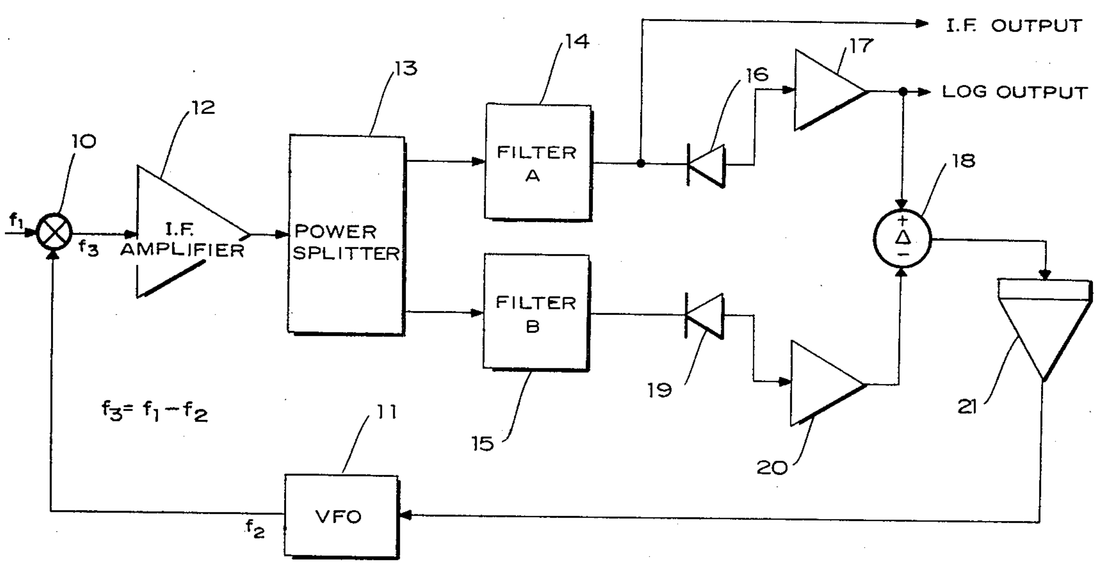
FIG. 1 is a block diagram of the frequency converter discriminator.

In the embodiment of FIG. 1, an input signal $f_1$, (video pulse train) is coupled to one input of a mixer 10. Another input to the mixer 10 comprises the output of a variable frequency oscillator 11 which forms part of a null seeking video servo loop which will be discussed later.

The output of the mixer 10 is coupled to an amplifier 12 the output of which is in turn coupled as an input to a power splitter 13. The power splitter 13 is a conventional and may be, for example, an in phase power splitter or a 3*db* coupler, both of which are well known. Power splitter 13 outputs two signals of essentially equal amplitude to a filter 14(A) and filter 15(B). The output of filter A is coupled through a video detector 16 as the input to a log video amplifier 17 the output of which is coupled as one input to a video differencing circuit 18.

The output of filter B is coupled through another video detector 19 as the input to another log amplifier 20 the output of which is coupled as another input to the video differencing circuit 18.

The output of filter 14 is also taken off as an IF output for other circuitry and a logarithmic output is taken from the output of the log video amplifier 17 for use in other circuitry also.

The difference signal from the video differencing amplifier 18 is coupled as an input to a pulse integrator 21 which provides an output DC voltage which in turn is coupled to the variable frequency oscillator 11.

The operation of the circuitry is as follows. The input frequency $f_1$ coupled to the mixer 10 is frequency converted to $f_3$ by the mixer and local oscillator frequency $f_2$. The IF frequency is then amplified in the IF amplifier 12 and filtered in filters 14 and 15. As previously noted, the signals feeding the filters from the power splitter 13 are equal in amplitude.

Figure 2:
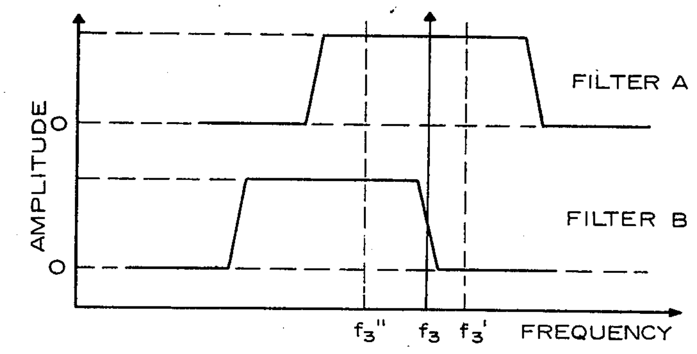
FIG. 2 is a graph of the filter outputs illustrating amplitude versus frequency.

Filter A has a bandwidth as illustrated in FIG. 2 which overlaps the bandwidth of filter B. As seen in FIG. 2, the midpoint of the trailing skirt of filter B falls in the middle of filter A at $f_3$. The output of filter A is the desired output $f_3$.

Under quiescent conditions, the inputs to the detectors will be as shown in FIG. 2 with $f_3$ at the midpoint of the trailing skirt of the output of filter B. In this condition, $f_3$ is essentially at the midpoint of the curve representing the band-pass of filter A. If $f_3$ decreases to $f_3''$, the output of filter B increases and the track loop drives $f_2$ down to drive $f_3''$ back to $f_3$. On the other hand, if $f_3$ increases to $f_3$, output B decreases and the track loop increases $f_2$ to drive $f_3$ back to the stable operating point $f_3$.

The detected signals are then logarithmically amplified and summed in the video difference amplifier 18. The polarity and amplitude at the output of the video differencing amplifier 18 indicate whether the local oscillator is too high or too low in frequency.

The pulse integrator 21 integrates the output of the video differencing amplifier 18 and drives the local oscillator to null the output of the differencing amplifier. At this point, the local oscillator and input signal are locked in. The track loop or feedback loop is designed to drive the variable frequency oscillator output $f_2$ in a direction until the stable operating point $f_3$ is reached. If $f_3$ increases the output of filter A (amplitude) does not change, however, the output from filter B decreases. The track loop would then increase the voltage drive to the variable frequency oscillator 11 to increase $f_2$ until the stable operating point $f_3$ is again reached. On the other hand, if $f_3$ should decrease, again the output of filter A (amplitude) would not change, however the output of filter B would increase in amplitude, causing the output of the local oscillator 11 ($f_2$) to decrease, thus driving $f_3$ back to the stable operating point.

A more sophisticated track loop could be employed and the system would then frequency track very short pulses, i.e., less than 150 nano-seconds. It is also possible to frequency gate, that is to say when locked on, a frequency other than the one being tracked would have an output, out of the difference amplifier 18, other than the frequency being tracked. This pulse could be gated out, thus preventing it from updating the integrator and thereby changing the output of the local oscillator 11.

The described unit is inherently stable in that the bandwidth is centered about a stable operating point determined by the skirt of one of the filters. In addition, the unit has a large instantaneous dynamic range and is inherently simple and reproducible. Furthermore, the frequency conversion is an integral part of the frequency discriminator, thus insuring excellent accuracy. In view of the fast response time of the system, it is also compatible with monopulse guidance techniques.

What is claimed is:

1. A system for deriving a constant intermediate frequency output signal comprising;
   - input means adapted to receive an input signal of a particular frequency which may vary over a range;
   - a servo loop operatively connected between the output of said filter means and said mixer means for maintaining said signal having a different frequency at a predetermined essentially constant frequency, including
     - means coupled to said first filter means for detecting the amplitude of the output of said first filter, means coupled to said second filter means for detecting the amplitude of the output of said second filter,
means for logarithmically amplifying the output of said first filter outputs amplitude detecting means,
means for logarithmically amplifying the output of said second filter output amplitude detecting means, and
means for combining the logarithmically amplified outputs.
mixer means coupled to said input means adapted to receive said input signal and output a signal having a different frequency;
power splitter means operatively coupled to the output of said mixer means and adapted to divide said difference frequency signal thereby providing at least two output signals;
filter means receiving one of said at least two output signals and having a predetermined pass band;
another filter means receiving the other of said at least two output signals and having a predetermined pass band different from said first mentioned filter means;
said combination of filter means providing output signals the amplitude of at least one of which varies with frequency; and 2. A system for deriving a constant intermediate frequency output signal as set forth in claim 1 wherein;
the output signals from said filter means and another filter means are essentially equal amplitude; and
wherein the cutoff point of one pass band of one of said filter means lies within the pass band of the other of sad filter means.

3. A system as set forth in claim 1 and further including;
a variable frequency oscillator included in said servo loop for producing an output frequency which is dependent upon an input voltage.

4. A system as set forth in claim 3 and further including;
differencing circuit means operatively coupled to the output of said at least two filter means for receiving the detected and log amplified outputs thereof and providing a difference signal therefrom;
said differencing circuit means being said combining means and said difference signal being operatively coupled to said variable frequency oscillator.

5. A system as set forth in claim 4 and further including;
pulse integrator means operatively coupled to the output of said differencing circuit means for providing an output voltage which is coupled to the variable frequency oscillator.

6. A system as set forth in claim 2 and further including;
differencing circuit means operatively coupled to the output of said at least two filter means for receiving the detected and logarithmically amplified outputs thereof and providing a difference signal corresponding to an output voltage therefrom,
wherein said differencing circuit means is said combining means; and
a variable frequency oscillator included in said servo loop for producing an output frequency which is dependent upon an input voltage;
said output voltage to said oscillator; and
the output frequency of said oscillator being coupled as another input to said mixer means.

* * * * *